Patented Apr. 28, 1953

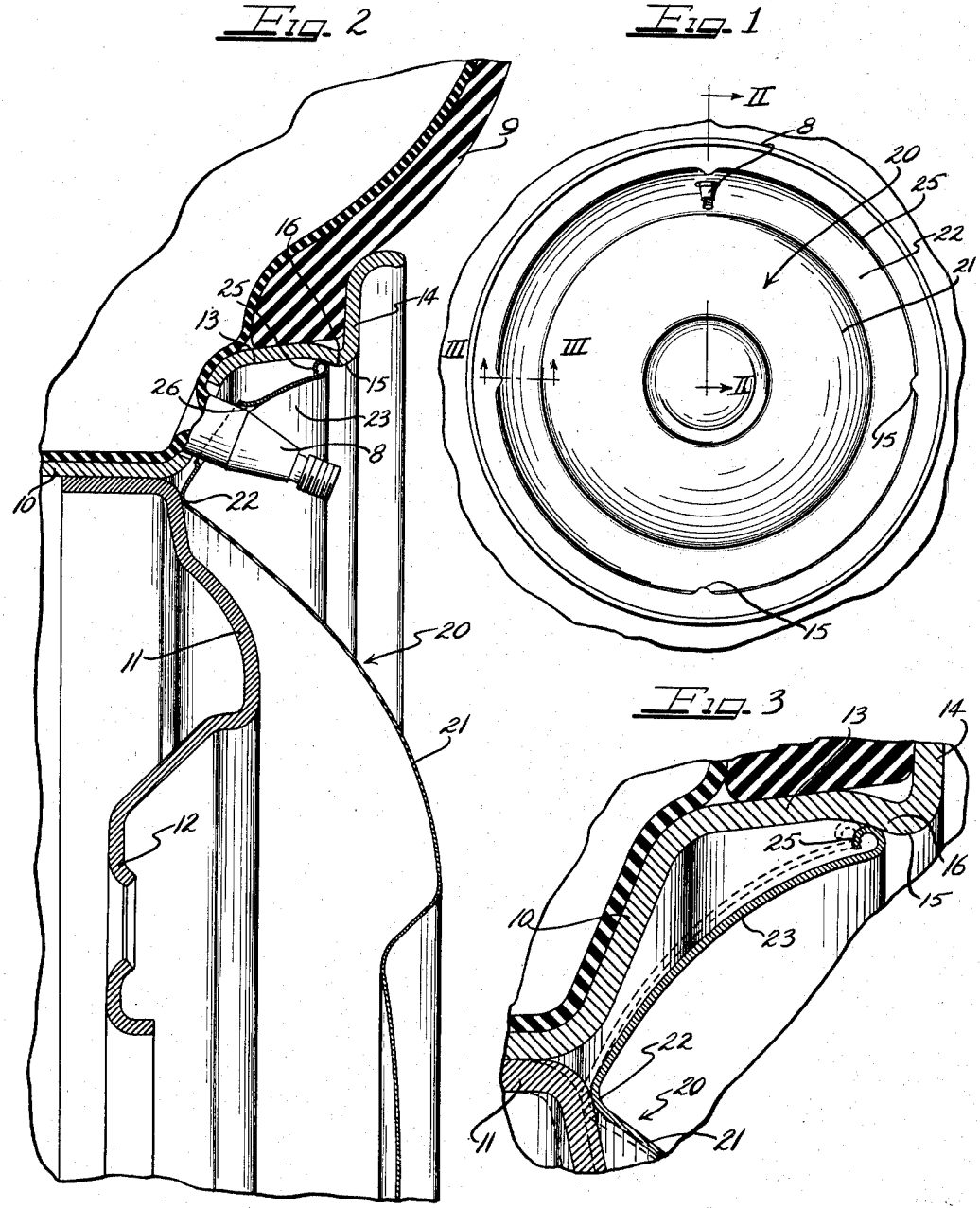

2,636,784

UNITED STATES PATENT OFFICE 2,636,784

WHEEL COVER

George Albert Lyon, Detroit, Mich.

Application October 12, 1948, Serial No. 54,165

1 Claim. (Cl. 301—37)

This invention relates to automobile wheel structures and more particularly to a wheel cover and the retention of the same on the wheel.

An object of this invention is to provide simplified means for detachably retaining the cover on the wheel and which will take into consideration manufacturing variations in the relative location of the tire rim and body parts of the wheel.

Another object of this invention is to provide a simple inexpensive wheel cover readily mountable on and detachable from a wheel and which lends itself to economical production in the form of a stamping.

In accordance with the general features of this invention there is provided in a wheel structure including a wheel having a body part and a multi-flange tire rim carried thereby and including a flange having radially inwardly facing circumferentially spaced cover retaining bumps; a wheel cover comprising a dished annular member having an outer annular portion extending radially and axially outwardly and terminating in an outer edge of a greater diameter than the smallest diameter of a circle common to the bumps so as to require springing of same to pass over and behind the bumps, the annular portion terminating radially inwardly in a shoulder for abutting the wheel body member after said edge has been sprung over and behind the bumps.

Another feature relates to the interrelating of the outer edge of the cover and the retaining bumps, in the aforesaid structure, in such manner that the edge can adjustably slide along the rear sides of the bumps until the cover bottoms against or abuts the body member.

The foregoing feature is advantageous in that it permits of the cover accommodating manufacturing variations in the wheel with particular regard to the allowable manufacturing tolerance with respect to the displacement of the wheel body member axially relative to the tire rim. This tolerance may be as much as one-eighth of an inch; and obviously, if the cover is to be tightly retained on the wheel, it should be adapted to accommodate itself to such allowable tolerance.

Other objects and features of this invention will more fully appear from the following detail description taken in connection with the accompanying drawing which illustrates a single embodiment thereof and in which:

Figure 1 is a fragmentary side view of a wheel structure having my novel cover applied thereto;

Figure 2 is an enlarged fragmentary cross-sectional view taken on substantially the line II—II of Figure 1 looking in the direction indicated by the arrows; and Figure 3 is an enlarged fragmentary cross-sectional view corresponding to a portion of Figure 2 and showing by dotted lines how the cover can move further inwardly on the wheel to take care of a greater inward displacement of the body member with reference to the tire rim.

As shown on the drawing:

The reference character 9 designates generally a conventional tire and tube assembly mounted in the usual way upon a multi-flange drop center tire rim 10. The tire and tube assembly 9 includes a usual valve stem 8 projecting outwardly through one of the side flanges of the rim.

The tire rim is carried in the usual way upon a dished body or spider part 11 having the customary circular bolt on flange 12 by means of which the wheel may be attached with screw or bolts (not shown) to a part on an automobile axle.

In addition one of the axial flanges 13 of the tire rim 10 has a plurality of radially inwardly projecting protuberances or bumps 15 located at the junction of that flange with a radial rim flange 14. These bumps may be of any suitable number such, for example, as 3 to 5, although, as shown in Figure 1, I have in the illustrated embodiment of the invention used four bumps. They are preferably circumferentially equidistantly spaced and have their innermost points arranged in a common circle.

In addition the bumps are, at their rear sides, each proveded with an inclined axially rearwardly and radially outwardly extending cam surface 16 leading into the surface of the flange 13 proper. It is these bumps that are proposed to use in the detachable retention of my novel cover, designated generally by the reference character 20, on the wheel.

The cover 20 is illustrated in the form of a dished metallic stamping made from thin sheet metal and may or may not, as desired, include a central crown or hub portion 21 for covering the central or hub part of the wheel. The central crown portion 21 extends axially and radially inwardly toward the junction of the body and rim parts of the wheel and terminates in an annular shoulder 22 adapted to abut the body part 11 adjacent tire rim 10.

Also the cover 20 is provided with an outer annular portion 23 extending axially and radially outwardly from shoulder 22 and terminating in a turned or curled edge 25 adapted to be resiliently cammed over and behind bumps 15. Also the portion 23 is provided with an opening 26 through which the valve stem 8 can project when the cover is on the wheel so that the valve stem is accessible without requiring removal of the cover.

Now in the application of the cover to the wheel, the opening 26 is first aligned with the valve stem 8 and then the cover is pressed axially toward the wheel so that the valve stem passes through the opening 26. Thereafter, when the outer turned edge 25 of the cover engages the innermost points of the bumps 15 the portion 23 yields slightly relative to shoulder 22 so that the edge 25 can pass over to a point behind the bumps and on the inclined surfaces 16 thereof (Figure 3). When in this position the cover is in stressed or resilient engagement with the rim 10 and is in reality wedged between the rim and the body part 11. In other words, the cover portion 23 is resiliently wedged between the inclined surfaces 16 of the bumps and the body part 11 at the point of engagement of the cover shoulder 22 thereby.

An advantageous feature of my invention relates to the fact that the cover portion 23 can accommodate itself by resilient deflection to some extent in the application of the cover, as shown by the dotted lines in Figure 3, so as to take care of manufacturing variations in the relative locations of the tire rim and body parts 11. For example, if the body part 11 is displaced slightly axially rearward, as shown by the dotted lines in Figure 3, the cover will move further into the wheel by inward and radially outward camming of the resilient reinforcing edge bead 24 along the slope of the inclined bump surfaces 16 as a result of the springing of the edge, as shown by the dotted lines, so that the cover shoulder 22 can still bottom tightly against the body part with its annular portion 23 tightly wedged between the body part and the bumps 15.

The cover may be easily removed from the wheel by simply engaging the edge 25 with the end of a pry-off tool, such as a screw driver, and forcibly ejecting it from the wheel. In other words, the edge 25 will yield when subjected to pressure and can be forcibly disengaged from its retaining cooperation with the bumps 15.

I claim as my invention:

In a wheel structure including a wheel having a body part and a multi-flange tire rim carried thereby and including a generally axially extending flange having at its outer margin radially inwardly facing circumferentially spaced cover retaining bumps having at the rear sides thereof axially inwardly and radially outwardly inclined respective cam surfaces of substantial axial length and low pitch relative to said flange, a wheel cover comprising a dished circular member having an outer annular portion extending radially and axially outwardly and terminating in an outer resiliently deflectable edge of a greater diameter than the smallest diameter of a circle common to said bumps so as to require springing of same to pass over and behind said bumps, said annular portion terminating radially inwardly in a shoulder for abutting against said body member after said edge has been sprung over and behind said bumps, the resilient stress of said edge against said cam surfaces of the bumps driving said annular portion and thereby said shoulder firmly against the body member to adjust for variation in the location of the body part with reference to the rim and whereby said shoulder bottoms on the body part irrespective of said variation.

GEORGE ALBERT LYON.

References Cited in the file of this patent

UNITED STATES PATENTS

| Number | Name | Date |
|---|---|---|
| 2,127,598 | Horn | Aug. 23, 1938 |
| 2,279,334 | Lyon | Apr. 14, 1942 |
| 2,421,386 | Lyon | June 3, 1947 |